(12) United States Patent
Huelskamp et al.

(10) Patent No.: US 9,073,240 B2
(45) Date of Patent: Jul. 7, 2015

(54) RECONFIGURABLE SHAPE MEMORY POLYMER TOOLING SUPPORTS

(75) Inventors: Scott Robert Huelskamp, Dayton, OH (US); Joel James Everhart, Xenia, OH (US); David E. Havens, Bellbrook, OH (US); Steven Fillmore Hanson, Derby, KS (US); Jeffrey W. Priest, Rose Hill, KS (US); Carl Ray Fiegenbaum, Rose Hill, KS (US); Thomas Joseph Barnell, Dayton, OH (US)

(73) Assignee: Spirit AeroSystems, Inc., Wichita, KS (US)

( * ) Notice: Subject to any disclaimer, the term of this patent is extended or adjusted under 35 U.S.C. 154(b) by 953 days.

(21) Appl. No.: 13/246,332

(22) Filed: Sep. 27, 2011

(65) Prior Publication Data
US 2012/0119416 A1    May 17, 2012

Related U.S. Application Data

(60) Provisional application No. 61/412,627, filed on Nov. 11, 2010.

(51) Int. Cl.
*B29C 70/28* (2006.01)
*B29C 33/48* (2006.01)
*B29C 33/04* (2006.01)

(52) U.S. Cl.
CPC ............. *B29C 33/485* (2013.01); *B29C 33/046* (2013.01)

(58) Field of Classification Search
None
See application file for complete search history.

(56) References Cited

U.S. PATENT DOCUMENTS

| 3,425,642 A | 2/1969 | May |
| 3,764,641 A | 10/1973 | Ash |
| 4,632,328 A | 12/1986 | Bishop et al. |
| 5,049,591 A | 9/1991 | Hayashi et al. |
| 5,057,252 A | 10/1991 | Kagawa et al. |

(Continued)

FOREIGN PATENT DOCUMENTS

| CN | 101041269 | 9/2007 |
| CN | 101055344 | 10/2007 |

(Continued)

OTHER PUBLICATIONS

Essemplex Thermoplastic Shape Memory Polymer Resin; Product Data Sheet; Copyright 2007. CRG Industries; http://www.crg-industries.com/datasheets/Essemplex%20data%20sheet.pdf.

(Continued)

*Primary Examiner* — Yogendra Gupta
*Assistant Examiner* — Kimberly A Stewart
(74) *Attorney, Agent, or Firm* — Hovey Williams LLP (57) ABSTRACT

A method and support apparatus for providing structural support to a mold or mandrel, such as a shape memory polymer (SMP) apparatus configured for shaping a composite part. The support apparatus may comprise a rigid structural member and a plurality of SMP cells attached thereto and configured to inflate or deploy in a malleable state toward and against a surface of the SMP apparatus, mold, or mandrel. Then the SMP cells may be returned to a rigid state while still pressed against this surface, thereby providing structural support when composite material is applied to an opposite surface of the SMP apparatus, mold, or mandrel. After the composite material is cured into the finished composite part, the SMP cells may be deflated or otherwise collapse toward the structural member to provide enough clearance to be removed from the cured composite part.

8 Claims, 6 Drawing Sheets

(56) References Cited

U.S. PATENT DOCUMENTS

| | | |
|---|---|---|
| 5,098,776 A | 3/1992 | Kobayashi et al. |
| 5,128,197 A | 7/1992 | Kobayashi et al. |
| 5,139,832 A | 8/1992 | Hayashi et al. |
| 5,151,277 A | 9/1992 | Bernardon et al. |
| 5,168,635 A | 12/1992 | Hoffman |
| 5,445,342 A | 8/1995 | Miller et al. |
| 5,546,784 A | 8/1996 | Haas et al. |
| 5,846,464 A | 12/1998 | Hoffman |
| 5,851,563 A | 12/1998 | Hoffman |
| 5,914,081 A | 6/1999 | Shevchuk |
| 5,954,175 A | 9/1999 | Haas et al. |
| 6,012,314 A | 1/2000 | Sullivan et al. |
| 6,053,026 A | 4/2000 | Nardiello et al. |
| 6,083,442 A | 7/2000 | Gabilly |
| 6,102,933 A | 8/2000 | Lee et al. |
| 6,160,084 A | 12/2000 | Langer et al. |
| 6,363,767 B1 | 4/2002 | Papazian et al. |
| 6,370,757 B2 | 4/2002 | Lee et al. |
| 6,388,043 B1 | 5/2002 | Langer et al. |
| 6,701,764 B2 | 3/2004 | Bruck et al. |
| 6,720,402 B2 | 4/2004 | Langer et al. |
| 6,759,481 B2 | 7/2004 | Tong |
| 6,827,325 B2 | 12/2004 | Hofmann et al. |
| 6,830,712 B1 | 12/2004 | Roffman et al. |
| 6,852,825 B2 | 2/2005 | Lendlein et al. |
| 6,858,680 B2 | 2/2005 | Gunatillake et al. |
| 6,910,714 B2 | 6/2005 | Browne et al. |
| 6,920,675 B2 | 7/2005 | Browne et al. |
| 6,979,050 B2 | 12/2005 | Browne et al. |
| 6,986,855 B1 | 1/2006 | Hood et al. |
| 6,991,280 B2 | 1/2006 | McKnight et al. |
| 7,013,536 B2 | 3/2006 | Golden et al. |
| 7,029,044 B2 | 4/2006 | Browne et al. |
| 7,029,056 B2 | 4/2006 | Browne et al. |
| 7,032,282 B2 | 4/2006 | Powell et al. |
| 7,059,664 B2 | 6/2006 | Aase et al. |
| 7,060,140 B2 | 6/2006 | Cheng et al. |
| 7,063,377 B2 | 6/2006 | Brei et al. |
| 7,067,606 B2 | 6/2006 | Mather et al. |
| 7,091,297 B2 | 8/2006 | Mather et al. |
| 7,105,117 B2 | 9/2006 | Rodgers et al. |
| 7,108,316 B2 | 9/2006 | Barvosa-Carter et al. |
| 7,118,652 B2 | 10/2006 | McKnight et al. |
| 7,146,690 B2 | 12/2006 | Stanford, Jr. et al. |
| 7,147,269 B2 | 12/2006 | Aase et al. |
| 7,147,271 B2 | 12/2006 | Aase et al. |
| 7,178,859 B2 | 2/2007 | Browne et al. |
| 7,188,498 B2 | 3/2007 | Browne et al. |
| 7,200,902 B2 | 4/2007 | Browne et al. |
| 7,204,472 B2 | 4/2007 | Jones et al. |
| 7,217,744 B2 | 5/2007 | Lendlein et al. |
| 7,252,313 B2 | 8/2007 | Browne et al. |
| 7,267,367 B2 | 9/2007 | Barvosa-Carter et al. |
| 7,276,195 B1 | 10/2007 | Tong |
| 7,284,786 B2 | 10/2007 | Browne et al. |
| 7,308,738 B2 | 12/2007 | Barvosa-Carter et al. |
| 7,309,104 B2 | 12/2007 | Browne et al. |
| 7,331,616 B2 | 2/2008 | Brei et al. |
| 7,332,688 B2 | 2/2008 | Browne et al. |
| 7,350,851 B2 | 4/2008 | Barvosa-Carter et al. |
| 7,370,894 B2 | 5/2008 | Browne et al. |
| 7,392,876 B2 | 7/2008 | Browne et al. |
| 7,401,845 B2 | 7/2008 | Alexander et al. |
| 7,401,846 B2 | 7/2008 | Browne et al. |
| 7,422,714 B1 | 9/2008 | Hood et al. |
| 7,429,074 B2 | 9/2008 | McKnight et al. |
| 7,448,678 B2 | 11/2008 | Browne et al. |
| 7,455,147 B2 | 11/2008 | Browne et al. |
| 7,478,845 B2 | 1/2009 | Mankame et al. |
| 7,480,975 B2 | 1/2009 | Verbrugge et al. |
| 7,484,735 B2 | 2/2009 | Verbrugge et al. |
| 7,498,926 B2 | 3/2009 | Browne et al. |
| 7,500,704 B2 | 3/2009 | Herrera et al. |
| 7,538,472 B2 | 5/2009 | Browne et al. |
| 7,556,117 B2 | 7/2009 | Browne et al. |
| 7,556,313 B2 | 7/2009 | Browne et al. |
| 7,587,805 B2 | 9/2009 | Browne et al. |
| 7,591,834 B2 | 9/2009 | Buckley et al. |
| 7,594,259 B1 | 9/2009 | Audet et al. |
| 7,594,697 B2 | 9/2009 | Browne et al. |
| 7,597,616 B2 | 10/2009 | Browne et al. |
| 7,601,274 B2 | 10/2009 | Mather et al. |
| 7,607,634 B2 | 10/2009 | Browne et al. |
| 7,607,717 B2 | 10/2009 | Browne et al. |
| 7,622,069 B1 * | 11/2009 | Kia et al. .............. 264/314 |
| 2003/0055198 A1 | 3/2003 | Langer et al. |
| 2004/0011525 A1 | 1/2004 | Jones et al. |
| 2004/0014929 A1 | 1/2004 | Lendlein et al. |
| 2004/0015187 A1 | 1/2004 | Lendlein et al. |
| 2004/0033515 A1 | 2/2004 | Cao et al. |
| 2004/0033553 A1 | 2/2004 | Littarru et al. |
| 2005/0211870 A1 | 9/2005 | Browne et al. |
| 2005/0212630 A1 | 9/2005 | Buckley et al. |
| 2005/0244353 A1 | 11/2005 | Lendlein et al. |
| 2006/0115799 A1 | 6/2006 | Stephen et al. |
| 2006/0116503 A1 | 6/2006 | Lendlein et al. |
| 2006/0140999 A1 | 6/2006 | Lendlein et al. |
| 2006/0287710 A1 | 12/2006 | Lendlein et al. |
| 2007/0088135 A1 | 4/2007 | Lendlein et al. |
| 2007/0129784 A1 | 6/2007 | Lendlein et al. |
| 2008/0021166 A1 | 1/2008 | Tong et al. |
| 2008/0021188 A1 | 1/2008 | Tong et al. |
| 2008/0023890 A1 | 1/2008 | Sherman et al. |
| 2008/0085946 A1 | 4/2008 | Mather et al. |
| 2008/0228028 A1 | 9/2008 | Carlson et al. |
| 2008/0236720 A1 | 10/2008 | Sigler et al. |
| 2008/0262188 A1 | 10/2008 | Xie et al. |
| 2008/0269420 A1 | 10/2008 | Tong et al. |
| 2008/0272615 A1 | 11/2008 | McKnight et al. |
| 2008/0314510 A1 | 12/2008 | Hood |
| 2008/0315466 A1 | 12/2008 | Hood et al. |
| 2009/0023827 A1 | 1/2009 | Lendlein |
| 2009/0036627 A1 | 2/2009 | Lendlein et al. |
| 2009/0047489 A1 | 2/2009 | Grummon et al. |
| 2009/0065650 A1 | 3/2009 | McKeon et al. |
| 2009/0092807 A1 | 4/2009 | Hu et al. |
| 2009/0095865 A1 | 4/2009 | Everhart et al. |
| 2009/0131604 A1 | 5/2009 | Lendlein |
| 2009/0163664 A1 | 6/2009 | Lendlein et al. |
| 2009/0176896 A1 | 7/2009 | Lendlein |
| 2009/0240075 A1 | 9/2009 | Mather et al. |

FOREIGN PATENT DOCUMENTS

| | | |
|---|---|---|
| EP | 2075279 | 1/2009 |
| WO | WO2005108448 | 11/2005 |
| WO | WO2005118248 | 12/2005 |
| WO | WO2006046974 | 5/2006 |
| WO | WO2007001407 | 1/2007 |
| WO | WO2007002161 | 1/2007 |
| WO | WO2007070877 | 6/2007 |
| WO | WO2008051241 | 5/2008 |
| WO | WO2008108863 | 9/2008 |
| WO | W02009002586 | 12/2008 |

OTHER PUBLICATIONS

CRG—Veriflex Shape Memory Polymer; Advanced materials Portfolio; Veriflex Shape Memory Polymer; http://verilyte.com/technology/materialsportfolio/veriflex.shtml; Copyright 2003-2011 Cornerstone Research Group, Inc. Copyright Dec. 12, 2003.

SAO/NASA ADS Physics Abstract Service; Shape Memory Polymer Configurative Tooling; http://adsabs.harvard.edu/abs/2004SPIE. 5388...87E; Published Jul. 2004.

CM; Composites Manufacturing; The Official magazine of the American Composites Manufacturers Association; Article: Trapped Tooling; Building the Unbuildable, New designs, new tooling materials, new approaches. By: Linda Clements; Published Jun. 2005.

AFRL-ML-WP-TP-2006-406; "High-Temperature Reusable Shape Memory Polymer Mandrels" (Preprint); by: Matthew C. Everhart and Beth A. Knapp; Mar. 2006; Airforce Research Laboratory.

Scientific Paper; "High-Temperature Reusable Shape Memory Polymer Mandrels"; by: Matthew C. Everhart, DaAnna L. Harris, David (56) References Cited

OTHER PUBLICATIONS

M. Nickerson and Richard D. Hreha; Cornerstone Research Group, Inc., 2750 Indian Ripple Road, Dayton, Ohio 45440; Published Mar. 30, 2006.
High-Performance Composites; Design and Manufacturing Solutions for Industry; Published Jul. 2006; www.compositesworld.com; "New tooling concepts spur innovation."
Article from High-Performance Composites Jul. 2006; by: Sara Block; Tooling and Toolmaking Innovations Continue; Posted Jul. 1, 2006; Tooling and Toolmaking Innovations Continue : Composites World.
American Composites Manufacturers Association (ACMA)—Feature: Article : "Morphing: The Shape of Wings to Come" by: Chris Red; Published Jul. 26, 2006; http://www.acmanet.org/CM/0706/feature_d0706.cfm.
E-news; National Composites Network; "Cornerstone Research Group: Shape Memory Polymers"; NCN website: www.ncn-uk.co.uk; Published Sep. 2006.
CRG Industries; for Immediate Release; Published Jan. 22, 2007; "CRG Industries presents our award-winning Smart-Mandrels Tubes, winner of SPIE 2005 Smart materials and Structures Award."
Materials Science and Technology Polymers; Shape memory polymers detect changes in temperature or light level; Technical Contact: Linda Domeier; Science Matter Contact: Alan Burns, Ph.D.; Published Jun. 2007; LDRD: Laboratory Directed Research and Development; Sandia National Laboratories.
SAMPE 2007 Baltimore : Composites World; SAMPE 2007 Baltimore; The SAMPE Symposium's cross-country move proves a welcome boon to East Coast suppliers and composites professionals; Article From: High-Performance Composites Jul. 2007; Staff; Posted on Jul. 1, 2007; http://www.compositesworld.com/articles/sampe-2007-baltimore.
Shape memory Polymer Bladder Tooling; Navy SBIR RY2008.1; http://www.navysbir.com/08_1/81.htm; published Jul. 13, 2007.
CRG—SMP Bladders; Manufacturing Technology Portfolio; Shape Memory Polymer (SMP) Bladders for Composites Manufacturing; http://www.crgrp.com/technology/mantechportolio/smp-bladders.shtml; Published Jul. 13, 2007.
SAMPE Fall Technical Conference and Exhibition; Oct. 29-Nov. 1, 2007; Cincinnati, Ohio,Cincinnati Hilton Netherland Plaza, Sponsored by SAMPE's Midwest Chapter; From Art to Science: Advancing Materials and Process Engineering; Published Jul. 19, 2007.
Reinforced Plastics—Preview: Composites 2007; Reinforced Plastics.com; Feature Preview: Composites 2007; Aug. 31, 2007; Reinforced Plastics; http://www.reinforcedplastics.com/view/3605/preview-composites-2007-/; p. 4.
Elastic Memory Composite (EMC) Material; Composite Technology Development, Inc: Engineered Material Solutions; Products; TEMBO Shape Memory Polymers and Elastic Memory Composites; http://www.ctd_materials.com/products/emc.htm; Published Oct. 2, 2007.
Technical Paper : Model Development for Shape Memory Polymers; Ryan D. Siskind and Ralph C. Smith; Department of Mathematics; North Carolina State University; Raleigh, NC 27695; Published 2008; http://www.ncsu.edu/crsc/reports/ftp/pdf/crsc-tr08-04.pdf.
Paper : Shape Memory Polymers; Published Oct. 8, 2008; http://www.plasticsprojects.org/Shape%20Memory%2010-12.pdf.
CRG—Shape Memory Polymer Nanocomposites: Multifunctional Materials for Revolutionary Applications; Power Point Presentation; Published Mar. 17, 2005.
SMP Bladders : Advanced Composite Tooling : Operate first as mandrels and later as inflatable bladders; CRG sales sheet: Copyright 2007.

\* cited by examiner

RECONFIGURABLE SHAPE MEMORY POLYMER TOOLING SUPPORTS

RELATED APPLICATIONS

The present utility patent application claims priority benefit, with regard to all common subject matter, of earlier-filed U.S. provisional patent application titled "Reconfigurable Shape Memory Polymer Tooling Support" Ser. No. 61/412627, filed Nov. 11, 2010, hereby incorporated in its entirety by reference into the present application.

BACKGROUND

1. Field

The present invention relates to systems and methods for using a reusable apparatus made of shape memory polymer (SMP) to fabricate composite parts.

2. Related Art

Composite parts, such as those used in the manufacture of aircraft, can be constructed using various production methods, such as filament winding, tape placement, overbraid, chop fiber roving, coating, hand lay up, or other composite processing techniques and curing processes. Most of these processes use a rigid cure tool/mandrel on which composite material is applied and then cured into a rigid composite part. Removing the mandrel from the cured composite part is generally difficult, costly, and/or time-consuming, particularly if the resulting composite part has trapping geometry that precludes easy part removal. One known method of removing the mandrel requires sacrificing or destroying the mandrel by cutting, dissolving, bead-blasting, or otherwise breaking down the mandrel into smaller pieces which can be removed from within the composite part. Destroying the mandrel obviously prevents it from being used again for subsequent parts and can be damaging to an inner surface of the composite part.

Another method uses a segmented mandrel that can be disassembled and removed after the composite part is cured. However, these mandrels are expensive and require a great amount of time to install and remove. Furthermore, these segmented mandrels are typically each designed to fabricate a specific composite part and are not easily reconfigured to be used in the manufacture of other composite parts.

Yet another method uses inflatable mandrels that can be removed by deflating them after the composite part is cured. However, this method typically involves balloon-like mandrels that can only be used as a bagging aid due to their relative lack of strength and rigidity during composite lay-up.

Accordingly, there is a need to structurally support inflatable or formable mandrels during the forming of a composite part.

SUMMARY

Embodiments of the present invention include a support apparatus configured for providing internal support to a shape memory polymer (SMP) apparatus, mold, or tooling for forming composite parts. The support apparatus may comprise a rigid structural member, a plurality of inflatable or deployable SMP cells inflatable or deployable through openings in the rigid structural member, and a pressurization system configured to inflate or deploy the SMP cells to extend from the rigid structural member. Specifically, the SMP cells may be made of shape memory polymer (SMP) configured to be actuated to transition between a rigid state and a malleable state. For example, the SMP cells may be configured to be rigid at temperatures below $T_g$ and to become malleable at temperatures above $T_g$. The rigid structural member may be configured to remain rigid when heated to a temperature sufficient for curing a composite part. The pressurization system may inflate or deploy the SMP cells when the SMP cells are in the malleable state. When cooled in the inflated configuration, the SMP cells may be configured to provide a load path between the SMP apparatus and the rigid structural member during application of composite material onto the SMP apparatus.

A method of forming a composite part on an SMP apparatus composed of SMP material may comprise placing a support apparatus proximate to at least one surface of the SMP apparatus. The support apparatus may comprise a rigid structural member, a plurality of inflatable or deployable SMP cells extending from the rigid structural member and actuatable between a rigid state and a malleable state, and a pressurization system configured to inflate or deploy the SMP cells away from the rigid structural member. The method may further comprise actuating the SMP cells to the malleable state and then inflating or deploying the SMP cells with the pressurization system such that the SMP cells press against the surface(s) of the SMP apparatus while in the malleable state. The method may also comprise actuating the SMP cells to the rigid state while the SMP cells are pressed against the surface(s) of the SMP apparatus, thus providing a rigid load path between the SMP apparatus and the rigid structural member. Then the method may comprise applying uncured composite material to another surface of the SMP apparatus opposite of the surface(s) of the SMP apparatus in contact with the SMP cells.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

DESCRIPTION OF DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figures 1, 2:
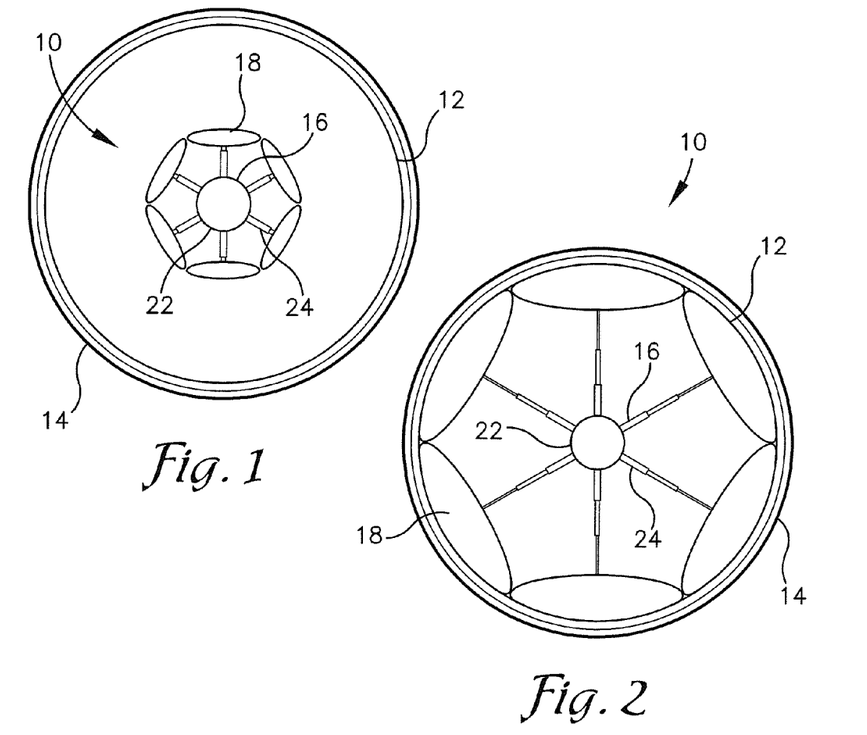
FIG. 1 is an end view of a support apparatus constructed in accordance with an embodiment of the present invention, illustrating the support apparatus inside of a shape memory polymer (SMP) apparatus wrapped with composite material.
FIG. 2 is an end view of the support apparatus of FIG. 1 extended into an inflated and deployed configuration, pressing against the SMP apparatus.

As illustrated in FIGS. 1-2, some embodiments of the present invention comprise a support apparatus 10 configured to provide structural support to a mold, tooling, or a shape memory polymer (SMP) apparatus 12, such as one of the hollow SMP apparatuses described in the following co-pending U.S. Patent Applications: U.S. application Ser. Nos. 13/238,695; 13/238,879; 13/238,733; 13/238,841; and 13/238,775, each incorporated herein by reference in their entirety. These incorporated applications disclose some embodiments of the SMP apparatus 12 being used as a rigid mandrel for composite material lay-up and then being triggered to change to a malleable state to be inflated during cure and/or to be removed from the composite part after cure. When used in this manner, the SMP apparatus 12 generally must be thin enough to form effectively, but also stiff enough to resist deflecting under out-of-plane loading imposed by the force of automated composite lay-up equipment such as filament winders and tape laying machines. It is also generally desirable for the SMP apparatus 12 to have sufficient structural stiffness to resist bending under its own weight and the weight of the composite material placed thereon. The need for the SMP apparatus 12 to be thin for forming conflicts with the structural stiffness requirements for composite material application. Thus, the support apparatus 10 is designed to structurally support the SMP apparatus 12 for forming a composite part so that the SMP apparatus 12 does not collapse under the weight of the composite material 14 or the pressure applied when placing the composite material 14 on the SMP apparatus 12, while still keeping the SMP apparatus 12 dimensions within a formable range.

SMP Apparatus

The SMP apparatus 12, as illustrated in FIGS. 1-2, may be formed of SMP material cast into any memory shape. For example, the SMP apparatus 12 may be cast into an elongated and/or hollow configuration having one or more open ends using any method known in the art, such as methods of forming an SMP cylinder disclosed in U.S. Pat. No. 7,422,714, incorporated by reference herein in its entirety. For example, the SMP apparatus 12 may be a pre-formed SMP cylinder or barrel open at two opposing ends. Alternatively, the SMP apparatus 12 may have any cross-sectional shape, such as a trapezoid, rectangle, square, or triangle, or may be cast into a non-hollow configuration. The casted shape of the SMP apparatus is referred to herein as its memory shape.

The SMP material used to form the SMP apparatus 12 may be reinforced or unreinforced SMP material. Specifically, the SMP material used to form the SMP apparatus 12 may be an epoxy, an epoxy-based SMP, a styrene copolymer based SMP or any other type or combination of SMPs, such as cyanate ester, polyurethane, polyethylene homopolymer, styrene-butadiene, polyisoprene, copolymers of stearyl acrylate and acrylic acid or methyl acrylate, norbornene or dimethaneoctahydronapthalene homopolymers or copolymers, and malemide. For example, the SMP material used in the SMP apparatus 12 may be any of the SMPs described in U.S. Pat. Nos. 7,422,714, 6,986,855, 7,276,195, U.S. Patent Application Publication No. 2008/0021188, U.S. Patent Application Publication No. 2008/0021166, and/or U.S. Patent Application Publication No. 2008/0269420, all of which are incorporated herein in their entireties by reference. However, numerous other types of SMPs exist and can be tailored to meet specific tolerances and temperature requirements.

The modulus of various SMP materials can be changed through several different methods, such as a temperature change, an electric current, water, and/or light. However, the exemplary methods described herein disclose the use of temperature changes to transform the SMP apparatus 12 from a malleable state to a rigid state and vice versa. Nevertheless, any of the above-listed triggers or actuation techniques for changing the modulus of the SMP material of the SMP apparatus 12 may be used for the composite part fabrication methods described herein without departing from the scope of the invention.

A glass transition temperature ($T_g$) of an SMP material may be a threshold temperature at and/or above which that SMP material may transition to a lower modulus state, become softened and/or malleable in order to be deformed. Therefore, the SMP apparatus 12 of the present invention may be configured to become flexible and formable when it is heated above its $T_g$ and to become rigid when cooled to a temperature below its $T_g$. If the SMP apparatus 12 is deformed at a temperature above $T_g$ and then held in that deformed state as its temperature drops below $T_g$, then the SMP apparatus 12 may harden in that deformed state. When heated again, the SMP apparatus 12 may return to its originally-casted memory shape unless otherwise acted on by another force.

The SMP apparatus 12 may be made of an SMP material having any $T_g$ appropriate for the uses and methods described herein. In some embodiments of the invention, $T_g$ may be equal to or less than the curing temperature for the composite material 14, such that the SMP apparatus 12 may be used as an expandable bladder during curing of the composite part. In some embodiments of the invention, $T_g$ may be a temperature between 100° F. and 350° F. Furthermore, $T_g$ may be a temperature between 200° F. and 300° F. or between 225° F. and 275° F. In one embodiment of the invention, $T_g$ may be approximately equal to 250° F. For example, the change in modulus of the SMP apparatus 12 may occur within a small temperature range centered at a $T_g$ of approximately 250° F.

The composite material 14 placed on the SMP apparatus 12 to form the composite part may comprise or be in the form of prepreg, wet processed fiber, dry fiber, continuous fiber, discontinuous fiber, chopped fiber, low temperature resin, high temperature resin, toughened resin, glass, KEVLAR, carbon, and/or core. Furthermore, the chemical makeup of the composite material 12 may include epoxy, BMI, benzoxazine, and other similar substances known in the art. The composite material 14 may be placed onto the SMP apparatus 12 using automated fabric placement, automated fiber placement, automated filament winding, fabric placement, hand lay-up, or any other method known in the art. The composite material 14 may be configured to be hardened or cured, such as in an autoclave, out of an autoclave, via a low-temperature cure process, and/or via a high-temperature cure process.

In use, the SMP apparatus 12 may be actuated or triggered to its malleable state, formed into the mandrel configuration, then actuated, triggered, or otherwise allowed to return to its rigid state, such as by cooling the SMP apparatus 12 below $T_g$. Next, the composite material 14 may be applied thereon. For example, in its malleable state, the SMP apparatus 12 may be shaped by inflation or any induced pressure differential driving the SMP apparatus 12 toward a mold. Specifically, the SMP apparatus 12 may be placed inside the mold, outside the mold, and/or proximate to a surface of the mold in order to be driven toward and shaped by the mold. Specifically, the SMP apparatus 12 may be heated and inflated or otherwise deformed into a mandrel configuration for forming a surface (such as an inner surface) of a composite part. Once the SMP apparatus 12 is cooled or otherwise converted to its rigid state while in the mandrel configuration, as illustrated in FIG. 1, the composite material 14 may be placed thereon using any method known in the art, such as fiber placement or filament winding.

The SMP apparatus 12 may be used to form a variety of composite parts, such as aircraft fuselages, wings, nacelles, panels, ducts, and aircraft structural supports or stiffeners. Examples of aircraft structural supports may include stringers, frames, trapezoidal hat-shaped stiffeners, bell-shaped stiffeners, inverted hat stiffeners, J-stiffeners, F-stiffeners, blade stiffeners, I-stiffeners, C-stiffeners, and various types of core, such as honeycomb core. Additionally, the SMP apparatus 12 may be used to form a variety of other composite parts, such as trailers, automotive ducts and manifolds, hoses, tires, turbochargers, tanks, automobiles, racing vehicles, boats, yachts, bicycles, canoes, kayaks, paddles, sporting goods, gun stocks, grips, crossbows and accessories, golf clubs and related components, fishing rods, guitars, pipes, poles, building supplies, wind turbine blades, engine components, furniture, sail masts, electronic enclosures, armor, driveshafts, satellites, missiles, and spacecraft. These composite parts may be formed using methods similar to those described above.

Each of these composite parts may be formed using the SMP apparatus 12 by first forming the composite material 14 against at least a portion of the SMP apparatus 12 when the SMP apparatus 12 is in its rigid mandrel configuration. Then the composite material 14 may be compressed by inflation or expansion of the SMP apparatus 12 during curing of the composite material 14 into the composite part. Alternatively, the SMP apparatus 12 may remain rigid in its mandrel configuration during curing of the composite material 14 into the composite part, while an external apparatus, such as a vacuum bag or impermeable membrane, compresses and consolidates the composite material 14 against the SMP apparatus 12.

Support Apparatus

As illustrated in FIGS. 1-6, the support apparatus 10 may be configured for use during a step of forming of the SMP apparatus 12 into the mandrel configuration and/or during the step of forming the composite material 14 against the SMP apparatus 12 in its rigid mandrel configuration. Specifically, the support apparatus 10 may be configured to fit inside of or underneath the SMP apparatus 12. Additionally or alternatively, the support apparatus 10 may be positioned to contact at least one surface of the SMP apparatus 12 opposite of a surface thereof onto which the composite material 14 is to be placed.

Figure 3:
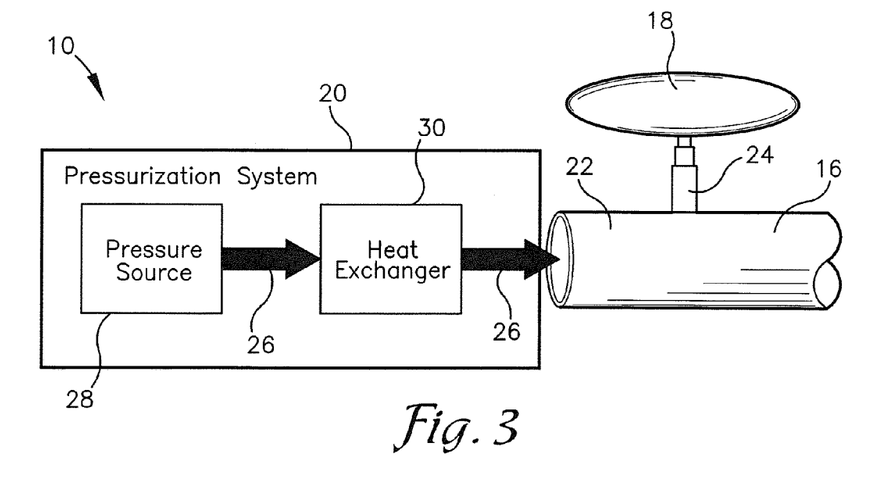
FIG. 3 is a schematic diagram of the support apparatus of FIG. 1 including a rigid structural member, an SMP cell, and a pressurization system of the support apparatus.

As illustrated schematically in FIG. 3, the support apparatus 10 may comprise a rigid structural member 16, a plurality of SMP cells 18 attached to, sealed to, and/or extendable from the structural member 16, and a pressurization system 20 configured to inflate and/or deploy the SMP cells 18 in a direction away from the structural member 16 when the SMP cells 18 are in the malleable state. Inflation or deployment of the SMP cells 18 while in their malleable state may allow the SMP cells 18 to conform to a portion of an inner surface of the SMP apparatus 12 and then hardened or returned to their rigid state while thus conformed, as described below. The support apparatus 10 thus provides internal structural support to the SMP apparatus 12 when composite material is applied to an outer surface of the SMP apparatus 12. For example, in some embodiments of the invention, this may prevent the SMP apparatus 12 from collapsing or deforming during filament winding of composite material onto the SMP apparatus 12.

The rigid structural member 16 may have any shape or configuration and may be formed of a material that remains rigid when subjected to composite cure temperatures and pressures. The structural member 16 may be configured to support attachment and/or sealing of the SMP cells 18 thereto. In some embodiments of the invention, the structural member 16 may have one or more openings formed therethrough, over which the SMP cells 18 may be sealed and through which inflation pressure may be provided to the SMP cells 18.

The SMP cells 18 may be formed of the same SMP material as the SMP apparatus 12 or any other SMP material known in the art and desired for a particular application. The $T_g$ of the SMP cells 18 may be identical to the $T_g$ of the SMP apparatus 12, or alternatively the SMP cells 18 may be composed of SMP material having a different $T_g$ than the SMP apparatus 12. The SMP cells 18 may be flat, contoured, and/or hollow and may be shaped in a variety of configurations. In some embodiments of the invention described herein, the SMP cells 18 may comprise a peripheral or edge portion sealed to the structural member 16. Additionally, as mentioned above, the SMP cells 18 may each be sealed around and/or over one of the openings formed through the structural member 16, such that pressure applied through the openings may inflate and/or deploy the SMP cells 18.

In some embodiments of the invention, as illustrated in FIG. 3, the pressurization system 20 may comprise tubes 26 and a pressure source 28. The tubes 26 may be any sort of air or liquid delivery system, such as hollow pipes connected between the pressure source and the SMP cells 18. The pressure source 28 may be configured to fluidly communicate with the tubes 26 and to force liquid, air, or other gasses into portions of the rigid structural member 16, the tubes 26, and/or to the SMP cells 18. For example, the pressure source 28 may be any sort of air pump or air compressor manually and/or electrically actuated. Additionally or alternatively, one or more of the SMP cells 18 may be configured to be inflated via pressurization of an autoclave (not shown). However, any method for inflating or deploying the SMP cells 18 by way of induced pressure differential may be used in the methods described herein without departing from the scope of the invention.

In some embodiments of the invention, the heating of the SMP cells 18 may be achieved by insertion into an oven or an autoclave. Additionally or alternatively, in some embodiments of the invention, the pressurization system 20 may comprise a heat exchanger 30, as illustrated in FIG. 3, which may be configured to heat the liquid, air, or other gasses provided by the pressure source 28. In these embodiments of the invention, a venting and circulation system (not shown) may be part of and/or fluidly coupled with the pressurization system 20. For example, heated liquid, air, or gasses may be circulated into the SMP cells 18 and vented out of the SMP cells 18 via the venting and circulation system. In some embodiments of the invention, the liquid, air, or gasses vented out of the SMP cells 18 may be re-circulated into the heat exchanger to be reheated and pumped back into the SMP cells 18. Heating the liquid, air, or gasses used to inflate the SMP cells 18 may allow better forming of the SMP cells 18 against the inner surface of the SMP apparatus 12.

Support Apparatus—Spoke and Bladder Configuration

In one embodiment of the invention, as illustrated in FIGS. 1-3, the rigid structural member 16 may comprise a center structural support 22 and a plurality of extension support members 24. For example, the extension support members may be arranged in a spoke-like configuration relative to the center support structure 22. The center support structure 22 may be an elongated cylindrical member or an elongated rigid structure having any cross-sectional shape. The extension support members 24 may be elongated and may extend substantially perpendicular relative to the center support structure 22. For example, if the center support structure 22 has a circular cross-section, the extension support members 22 may extend perpendicular to a tangent of the circular cross-section.

In some embodiments of the invention, the extension support members 24 may each be extendible and/or retractable, having a mechanically-adjustable length. For example, the extension support members 24 may be operable to telescope toward or away from the center support structure 22 either manually or by way of some automated actuation (e.g., a hydraulic cylinder). This feature may allow the support apparatus 10 to be used in SMP apparatuses of a large variety of configurations or sizes and/or may facilitate removal of the support apparatus 10 from within the SMP apparatus 12 by retraction of the extension support members 24.

Furthermore, in embodiments of the invention illustrated in FIGS. 1-3, the plurality of SMP cells 18 may be SMP bladders each formed of SMP material, as defined above. In this embodiment of the invention, the SMP cells 18 may be substantially hollow with an opening formed therein for fluid communication with the pressurization system 20. As illustrated in FIGS. 1-2, the SMP cells 18 or bladders may each be attached to one of the extension support members 24. The SMP cells 18 may be operable to be inflated when heated above $T_g$ or otherwise triggered to the malleable state. For example, inflation may be provided by forcing pressurized gas into the SMP cells 18 via their respective openings formed therein, or using any other inflation means known in the art.

The pressurization system 20 may be fluidly coupled with the SMP cells 18 in a variety of configurations. For example, in one embodiment of the invention, the central support structure 22 and/or the extension support members 24 may be substantially hollow, providing direct delivery of forced liquid or pressurized gas from the pressure source 28 to the SMP cells 18. Additionally or alternatively, various flexible or rigid tubes or any plumbing system may fluidly couple the SMP cells 18 with the pressurization system 20, providing inflation pressure to the SMP cells 18.

Support Apparatus—Inflatable Cell Configuration

Figure 4:
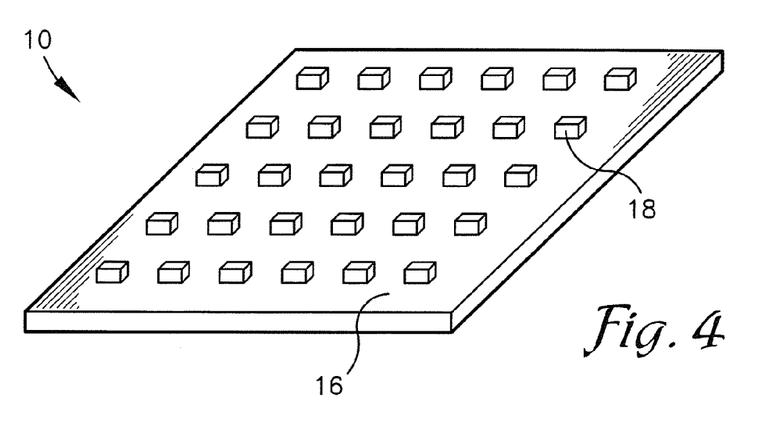
FIG. 4 is a top perspective view of an alternative embodiment of the support apparatus, illustrating the rigid structural member and a plurality of the SMP cells.

In an alternative embodiment of the invention, as illustrated in FIG. 4, the rigid structural member 16 may be a rigid sheet of material with openings (not shown) formed therethrough at which the SMP cells 18 are attached to the rigid structural member 16. In these embodiments of the invention, the rigid structural member 16 may be a flat or contoured rigid sheet of material or a hollow structure of various cross-sectional shapes, such as a cylinder, a trapezoid, or any other cross-sectional shape. In some embodiments of the invention, the rigid structural member 16 may have a general shape corresponding to one or more surfaces or inner surfaces of the SMP apparatus 12.

As illustrated in FIG. 4, the SMP cells 18 may each be sealed to the rigid structural member 16 around a periphery of one of the structural member openings such that liquid or pressurized gas forced through these openings inflate the SMP cells 18. For example, the SMP cells 18 and the openings may be connected to the pressurization system 20, such as the tubes 26 and/or the pressure source 28, as illustrated in FIG. 3.

During inflation, SMP cells 18 may each increase in size and/or surface area independently by an amount dependent on their location relative to a surface of the SMP apparatus 12. In this embodiment of the invention, the SMP cells 18 may be configured to both flex and stretch when heated above $T_g$. The SMP cells 18 of the configuration illustrated in FIG. 4 may have any geometry and/or cross-section, such as a block, a cylinder, or a dome. For example, the SMP cells 18 may comprise a domed end configured to contact a surface of the SMP apparatus 12 when inflated therein.

Support Apparatus—Diaphragm Configuration

In another alternative embodiment of the invention, as illustrated in FIGS. 5-11, the SMP cells 18 may be SMP diaphragms. Furthermore, in some embodiments of the invention, the pressure source 28 may also act as a vacuum source, such that the SMP cells 18 or diaphragms may be urged inward through the openings in the rigid structural member 16. The SMP cells 18 or diaphragms may comprise a shape or configuration which allows for inversion thereof via vacuum. For example, the SMP cells 18 in this embodiment of the invention may be designed and fabricated to a maximum height required, based on target applications for the associated support apparatus 10.

In some embodiments of the invention, the SMP cells 18 or diaphragms may be formed of an SMP material which may flex when heated above $T_g$, but not necessarily stretch. For example, the SMP cells 18 may be formed with a thickness and heated by such an amount during use that they may be deployed outward with pressure and/or inverted inward by vacuum without stretching during deployment. Furthermore, the SMP cells 18 or diaphragms may maintain a substantially constant surface area during use in either their deployed or inverted configurations.

Figure 8A:
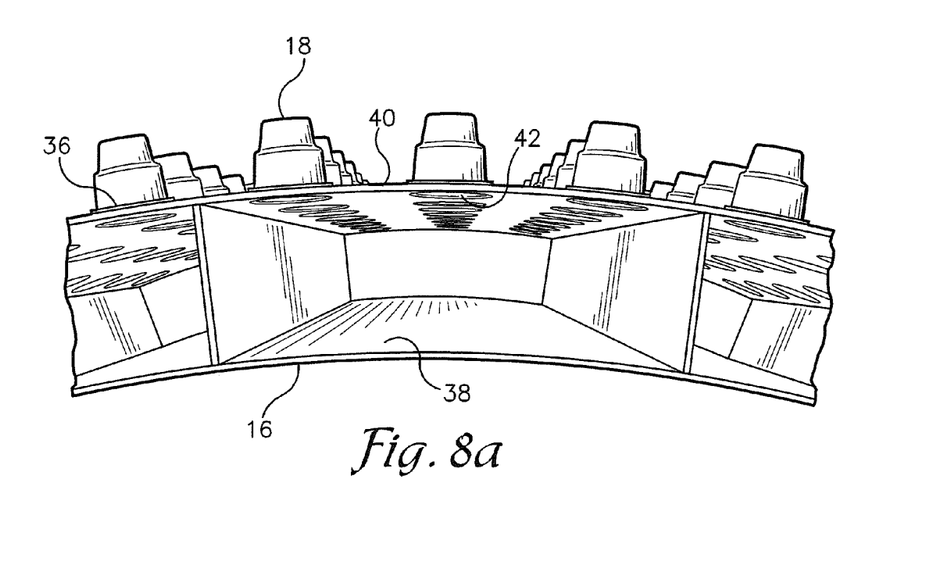
FIG. 8a is a fragmentary, perspective end view of the support apparatus of FIG. 6 illustrating the SMP cells in a deployed configuration.
Figure 8B:
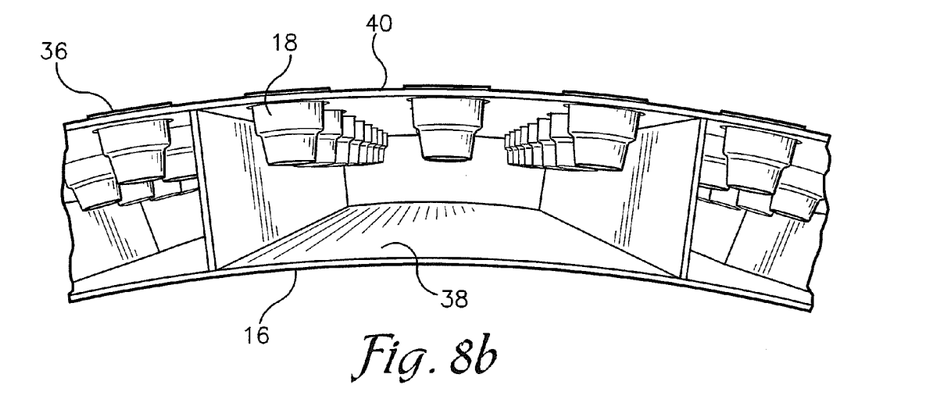
FIG. 8b is a fragmentary, perspective end view of the support apparatus of FIG. 6 illustrating the SMP cells in an inverted configuration.
Figure 9:
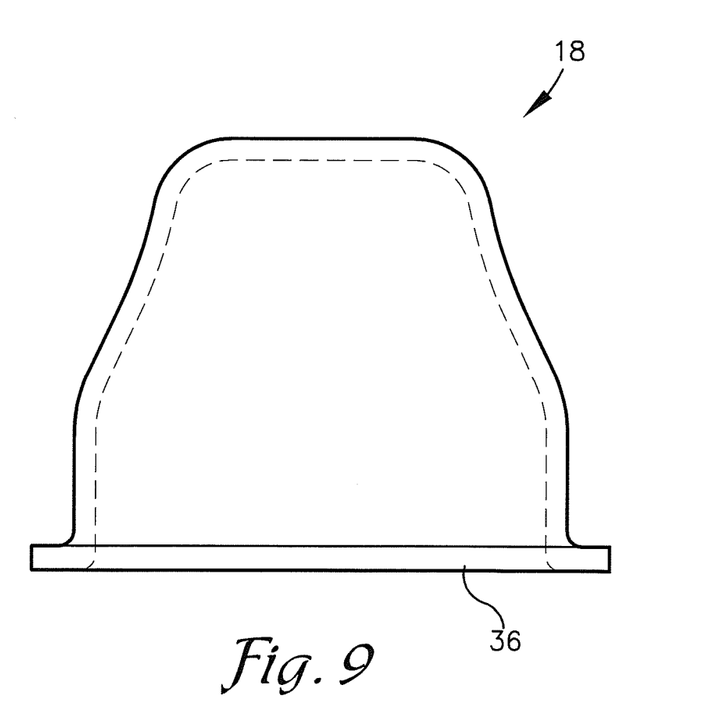
FIG. 9 is a side elevation view of another alternative embodiment of the SMP cells for the support apparatus of FIG. 5.

The SMP cells 18 of the embodiments illustrated in FIGS. 5-11 may comprise any shape or dimensions required for a given application, such as a cylindrical, conical, or hemispherical shape. For example, as illustrated in FIGS. 7, 8a, 8b, and 10, the SMP cells 18 may have a stepped-cup configuration, with a first cup section 32 and a second cup section 34. Each of these cup sections may or may not have a tapered volume. Furthermore, the first cup section 32 may have a greater minimum diameter than a maximum diameter of the second cup section 34. The stepped-cup configuration may also include additional cup sections, such as a third and/or fourth cup section (not shown) arranged in a similar stepped configuration. The stepped-cup configuration of the SMP cells 18 may allow for varying degrees of inversion by each cup section 32,34 and may require less force for inversion of the SMP cells 18 than some alternative shapes and configurations. An alternative embodiment of the SMP cell in the stepped configuration, but with a less defined boundary between the cup sections, is illustrated in FIG. 9.

Figure 10:
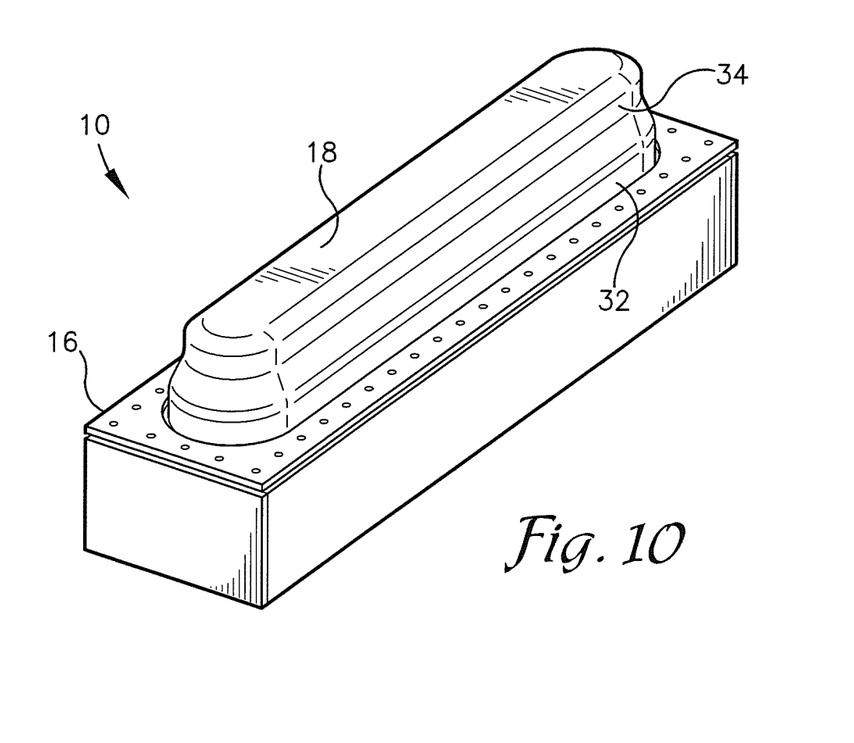
FIG. 10 is a perspective view of another alternative embodiment of the support apparatus, wherein the SMP cell has an elongated length.

In one embodiment of the invention, illustrated in FIG. 10, one or more of the SMP cells 18 may have an elongated or trough-like configuration, such that its length is substantially greater than its width. Furthermore, the elongated or trough-like SMP cells 18 may have a stepped-trough configuration, such that the first portion 32 of the SMP cell 18 has a greater minimum length and/or width than the maximum length and/or width of the second portion 34 of the SMP cell 18, as illustrated in FIG. 10. Note that the rigid structural member 16 illustrated in FIG. 10 is merely an example. The rigid structural member 16 illustrated with the elongated SMP cell 18 of FIG. 10 may be used with any rigid structural member 16, such as the rigid structural members illustrated in FIGS. 5-6, without departing from the scope of the present invention.

The SMP cells 18 or diaphragms may also comprise a lip or attachment portion 36 configured to seal the SMP cells 18 to a portion of the rigid structural member 16, as illustrated in FIGS. 8a and 8b. The attachment portion 36 may comprise SMP material and/or a rigid frame cast with the SMP cells 18. For example, a frame of rigid epoxy may be cast around each of the SMP cells 18. This frame or attachment portion 36 may be configured to remain rigid while the SMP cell 18 is above $T_g$, thereby providing a secure attachment or seal with the rigid structural member 16 and/or the associated pressurization system 20, as described below. The attachment portion 36 or frame may have any size or shape corresponding to a cross-sectional shape of the SMP cells 18.

Figure 5:
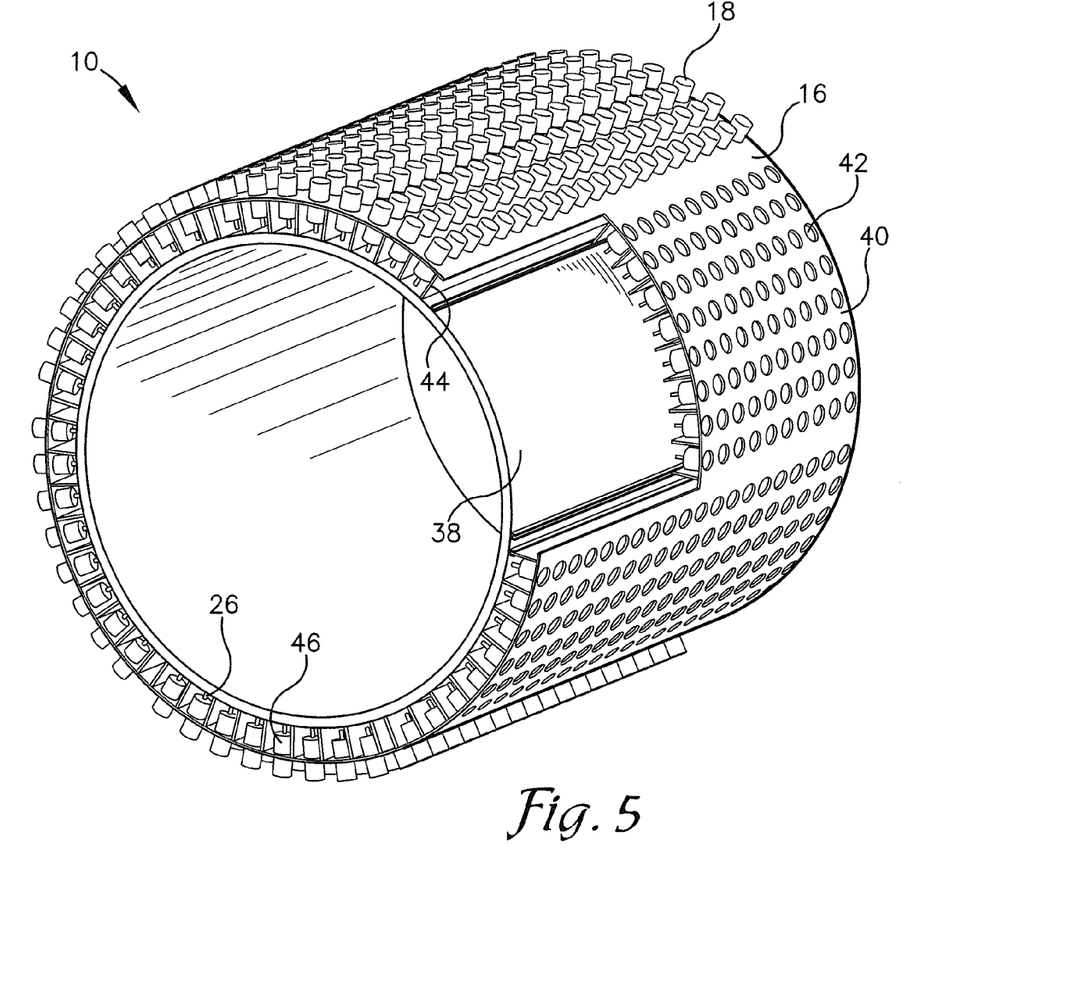
FIG. 5 is a perspective view of another alternative embodiment of the support apparatus with a fragment removed, illustrating a plurality of deployable and invertible SMP cells extending from a tray of the rigid structural member.
Figure 6:
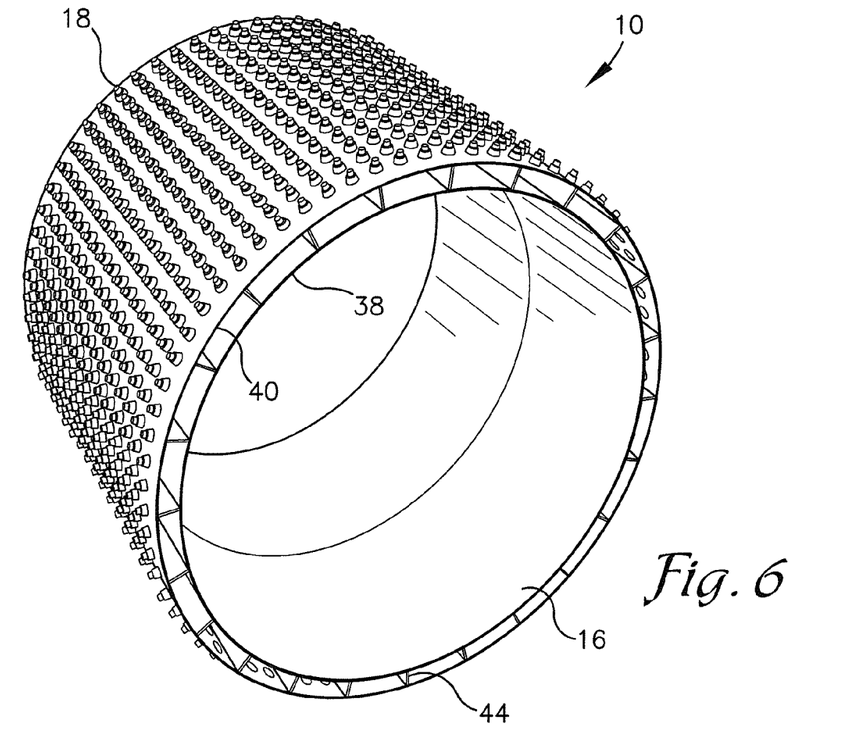
FIG. 6 is a perspective view of the support apparatus of FIG. 5, illustrating an alternative embodiment of the SMP cells.
Figure 7:
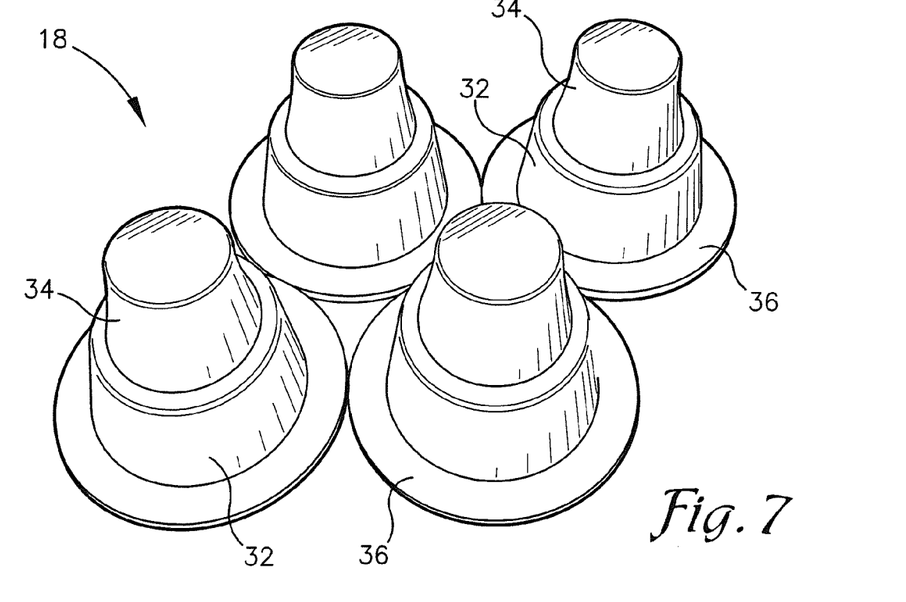
FIG. 7 is a perspective view of a plurality of the SMP cells of FIG. 6.

In some embodiments of the invention, as illustrated in FIG. 5, the rigid structural member 16 may comprise a rigid base component 38 integral with or attached to a rigid tray 40 having a plurality of openings 42 formed therethrough. For example, the base component 38 may be a cylinder, as illustrated in FIG. 5, and the tray 40 may surround the base component 38. Furthermore, the tray 40 may be supported a fixed distance apart from the base component 38 by support elements 44. For example, the support elements 44 may be walls or dividers extending along a length of the base component 38 and extending between an outer surface of the base component 38 and an inner surface of the tray 40.

Additionally, the structural member 16 may comprise or be attached to rigid containers 46 which may be aligned with the openings 42 of the tray 40 and fixed between the tray 40 and the base component 38. The containers 46 may comprise a primary opening (not shown) aligned with the tray openings 42 and/or an inflation opening (not shown) in fluid communication with the pressure source 28 via tubes 26. In this configuration, the SMP cells 18 may be sealed to the containers 46 over the primary opening thereof. For example, the attachment portion 36 of the SMP cells 18 may be sealed to the containers 46 and/or between the containers 46 and the tray 40. Furthermore, the SMP cells 18 may be housed in the containers 46 in an inverted configuration (when vacuum pulls the SMP cells 18 away from the SMP apparatus 12), and pushed outward from within the containers 46 in a deployed configuration (when supplied with liquid or pressurized gas forced through the inflation openings of the containers 46).

The height of the SMP cells 18 in this embodiment of the invention may be approximately equal to the greatest distance between the tray 40 and the SMP apparatus 12. Furthermore, the distance between the tray 40 and the base component 38 may be approximately equal to the height of the SMP cells 18. Additionally or alternatively, a depth of the containers 46 may be approximately equal to the height of the SMP cells 18, such that each of the SMP cells 18 may be fully inverted within their corresponding containers 46.

As in the previous embodiments of the invention described above, the support apparatus 10 of FIGS. 5-11 may also comprise the pressurization system 20 comprising tubes 26 and the pressure source 28, as illustrated in FIG. 3. One or more of the tubes 26 may also include a valve (not shown) which may be opened or closed manually or by some other actuating means. In some embodiments of the invention, each of the containers 46 may be associated with one of the valves, so that if one of the SMP cells 18 or diaphragms tears or unseals from its container 46, the other SMP cells 18 connected to the same tube 26 or line may still operate properly. Furthermore, in some embodiments of the invention, each of the SMP cells 18 may be vented such that newly-heated liquid, air, or gas may be continuously circulated through the SMP cells 18 during a given heating cycle or inflation cycle.

Methods of Use

In use, the SMP apparatus 12 may be heated and pressurized or otherwise formed into a desired shape. Then the support apparatus 10 may be inserted into the SMP apparatus 12 or arranged proximate thereto such that inflation or deployment of the SMP cells 18 causes the SMP cells 18 to contact at least one surface of the SMP apparatus 12. In some embodiments of the invention, the SMP apparatus 12 may be placed into a rigid outer mandrel tool (not shown) or clam shell, heated, and then inflated or deployed therein. Then the support apparatus 10 may be inserted into the SMP apparatus 12 and the SMP cells 18 may be heat and inflated or deployed while the SMP apparatus 12 remains in the outer mandrel tool. This may cause the SMP apparatus 12 to be sandwiched between the SMP cells 18 and the outer mandrel tool. Additionally or alternatively, the support apparatus 10 may be built into or onto the SMP apparatus 12 and the SMP apparatus 10 and SMP cells 18 may be simultaneously or sequentially deployed or inflated during a single heat cycle using an oven or autoclave to heat the SMP components.

In some alternative embodiments of the invention, inflating of the SMP apparatus 12 may be omitted. Rather, the inflation of the SMP cells 18 therein may push the SMP apparatus 12 outward against the outer mandrel tool. In another alternative embodiment of the invention, the SMP apparatus 12 may be formed or inflated into the desired shape within a mold while the SMP cells 18 are simultaneously inflated against a surface of the SMP apparatus. In yet another alternative embodiment of the invention, the SMP apparatus 12 may be in a rigid state and/or removed from the outer mandrel tool before the SMP cells 18 are heated and inflated therein, such that the SMP cells 18 may conform to the inner surface of the SMP apparatus 12 in its rigid mandrel state.

In some embodiments of the invention, such as those illustrated in FIGS. 1-3, use of the support apparatus 10 may further comprise actuating the extension support members 24 toward and/or away from the central support structure 22 once the support apparatus 10 is positioned inside the SMP apparatus 12, thus providing internal support for SMP apparatuses of different diameters or different shapes and configurations. For example, the extension support members 24 may be adjusted prior to inflation or deployment of the SMP cells 18.

Figure 11:
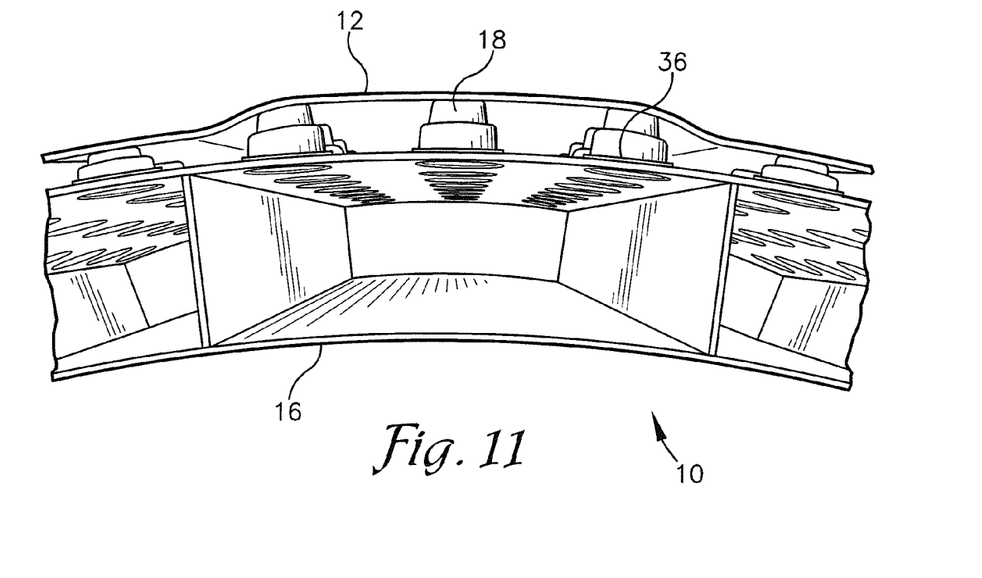
FIG. 11 is a fragmentary, perspective end view of the support apparatus of FIG. 6 illustrating the SMP cells in a deployed configuration pressing into the SMP apparatus.

After inflation or deployment of the SMP cells 18 against the SMP apparatus 12, the SMP cells 18 may be cooled and thereby hardened in their inflated state, as illustrated in FIGS. 2, 8a, and 11. The SMP cells 18 provide a load path between the rigid structural member 16 and the SMP apparatus 12 while the composite material 14 is applied thereon. After the composite material 14 is cured, the SMP bladders 18 and/or the SMP apparatus 12 may remain heated above $T_g$ or be otherwise triggered into the malleable state, such that they may be deflated or inverted, as illustrated in FIG. 8b, to be removed from within the resulting cured composite part.

In some embodiments of the invention, such as those illustrated in FIGS. 1-3, if the extension support members 24 were lengthened or extended away from the central support structure 22 before inflation of the SMP bladders 18, the extension support members 24 may be shortened or retracted toward the central support structure 22 in order to have enough clearance within the cured composite part to remove the support apparatus 10.

In the embodiments of the invention illustrated in FIGS. 5-11, vacuum may be applied by the pressurization system 20 while the SMP cells 18 are still in the malleable state. Thus, the SMP cells 18 may be inverted into their corresponding containers 46 through the openings 42 in the tray 40, providing clearance for the support apparatus 10 to be removed from within the SMP apparatus 12 and/or the resulting composite part. In other embodiments of the invention, as illustrated in FIGS. 1 and 4, the SMP cells 18 may be deflated to provide the proper clearance for removal from within the cured composite part.

Note that the inflation and/or vacuum described herein may be replaced with or provided in addition to any means for creating a pressure differential known in the art. For example, pressure for inflating or deflating the SMP apparatus 12 and/or the SMP cells 18 may be provided via an autoclave or any other system capable of inflating or deflating a sealed malleable material. Furthermore, though the support apparatus 10 is described herein as providing structural support for the SMP apparatus 12, note that the support apparatus 10 may also be used to provide structural support to any molding or mandrel tooling used to form composite parts.

Although the invention has been described with reference to the preferred embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming a composite part on an SMP apparatus composed of shape memory polymer (SMP), the method comprising:
    placing a support apparatus proximate to at least one surface of the SMP apparatus, wherein the support apparatus comprises:
        a rigid structural member that remains rigid when heated to a temperature sufficient for curing a composite part,
        a plurality of inflatable SMP cells made of shape memory polymer (SMP) configured to be actuated to transition between a rigid state and a malleable state, and
        a pressurization system configured to inflate the SMP cells away from the rigid structural member when the SMP cells are in the malleable state;
    actuating the SMP cells to the malleable state;
    inflating the SMP cells with the pressurization system such that the SMP cells press against the at least one surface of the SMP apparatus while in the malleable state;
    actuating the SMP cells to the rigid state while the SMP cells are pressed against the at least one surface of the SMP apparatus, thus providing a rigid load path between the SMP apparatus and the rigid structural member; and
    applying uncured composite material to a surface of the SMP apparatus opposite of the at least one surface of the SMP apparatus in contact with the SMP cells.

2. The method of claim 1, wherein the SMP cells are in the rigid state at temperatures below $T_g$ and are actuated into the malleable state when heated above $T_g$.

3. The method of claim 1, further comprising placing the SMP apparatus against at least one mold surface before the step of inflating the SMP cells, such that inflating the SMP cells sandwiches the SMP apparatus between the SMP cells and the at least one mold surface.

4. The method of claim 1, further comprising extending or retracting rods of the rigid structural member to place the SMP cells a desired distance away from the SMP apparatus.

5. The method of claim 1, further comprising:
    curing the composite material to form the composite part;
    actuating the SMP cells to the malleable state then deflating the SMP cells; and
    removing the support apparatus and SMP apparatus from the composite part.

6. The method of claim 1, wherein the rigid structural member comprises a center support structure and extension support members attached to the center support structure in a spoke-like configuration, wherein the SMP cells are attached to the extension support members at or proximate to ends thereof.

7. The method of claim 6, wherein the steps of actuating the SMP cells to a malleable state and inflating the SMP cells is performed by at least one of a pressurization system, an oven, an autoclave, and a heat exchanger.

8. The method of claim 5, wherein a pressurization system applies vacuum to the SMP cells to deflate the SMP cells.

* * * * *